Feb. 25, 1930.  G. E. WALLIS ET AL  1,748,320
REFRIGERATED AGITATING DEVICE
Filed Sept. 24, 1926
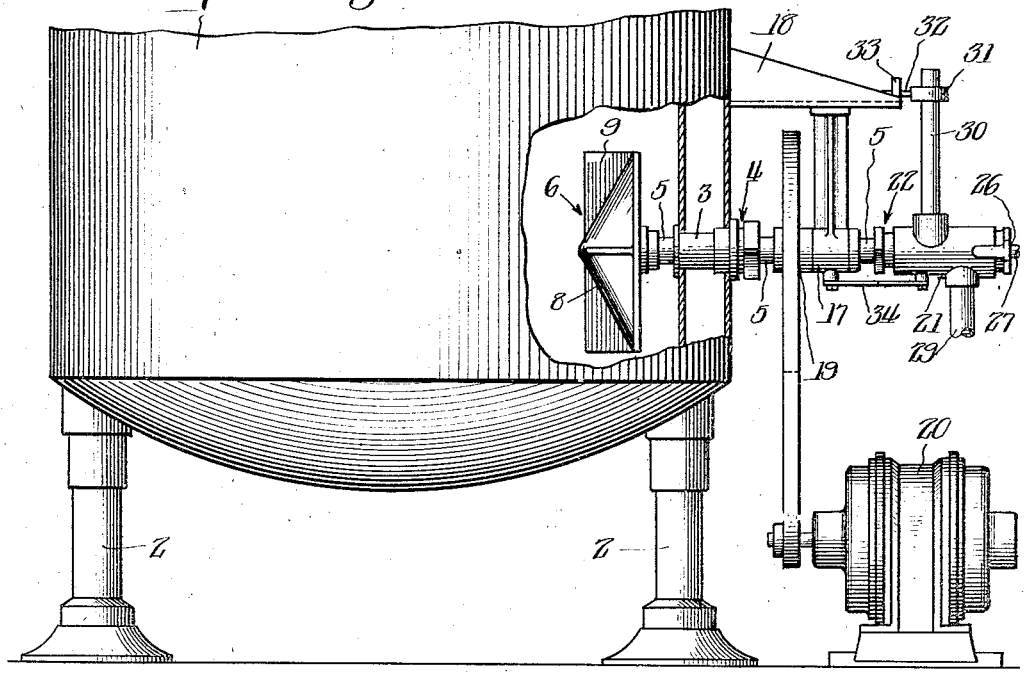
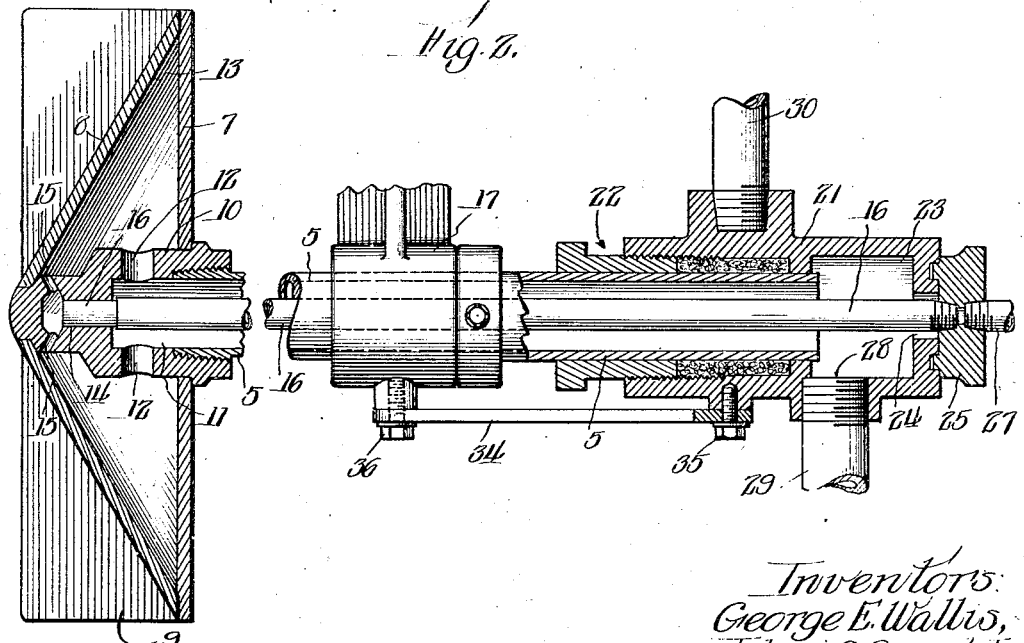
Inventors
George E. Wallis,
John C. Scovel Jr.
By Hewitt S. Dixon
Atty.

Patented Feb. 25, 1930

1,748,320

UNITED STATES PATENT OFFICE

GEORGE E. WALLIS, OF WENHAM, MASSACHUSETTS, AND JOHN C. SCOVEL, JR., OF CHICAGO, ILLINOIS, ASSIGNORS TO THE CREAMERY PACKAGE MFG. COMPANY, OF CHICAGO, ILLINOIS, A CORPORATION OF ILLINOIS

REFRIGERATED AGITATING DEVICE

Application filed September 24, 1926. Serial No. 137,417.

The invention relates to refrigerated agitating devices, more particularly to a refrigerated agitator adapted for cooling and stirring the contents of a liquid container or storage tank.

It is the practice in dairies and other plants, where milk and milk products are prepared for food consumption, to hold the milk, cream or other liquid mixture at a chilled temperature in large containers for short periods preceding further steps in the treatment of the liquid. It is essential to maintain a uniform temperature in the liquid so held, and to keep it in a state of gentle agitation to prevent separation of its constituents. A common arrangement of such containers comprises a double wall structure with provision for the circulation of a cooling medium between the inner and outer walls, and with an agitator positioned in the receptacle operated by a shaft extending through the walls of the container.

It is the object of the present invention to combine both the cooling and agitating functions in a unitary simple device displacing the single purpose agitator, thus obviating the necessity for the provision of any cooling means about the walls of the container and permitting the use thereabout of insulation only, the insulated tank being much more durable in use and economical in manufacture.

A further object is to adapt the combined cooler and agitator to the use directly of an expansible refrigerant, thus doing away with the intermediate brine, which is commonly used as the circulating cooling medium, with its attendant apparatus for cooling and circulating the brine.

Other objects and advantages will be apparent in the following detailed description of a preferred embodiment of our invention which we have illustrated in the accompanying drawings. It will be understood, however, that various changes in form, construction and arrangement may be made by those skilled in the art without departing from the scope and spirit of the invention as expressed in the appended claims.

Referring to the drawings, Fig. 1 is a view in elevation of my invention as applied to a storage tank, the latter being shown in fractional part. Fig. 2 is a sectional elevation of the agitator, and of the means for supplying refrigerant thereto.

In the drawings, the numeral 1 indicates the lower portion of a double-walled storage tank supported on the standards 2. Positioned in the side walls of the tank is a conventional bearing sleeve 3 having a conventional packing gland indicated at 4, and within which bearing and gland is operatively supported a tubular shaft 5 extending into the tank and operatively carrying the agitator 6. The latter comprises a hollow body portion constructed of the rear wall 7 and a preferably cone-shaped front wall 8 upon which may be formed vanes 9 of any suitable contour for the agitating movement of the liquid within the tank by the rotation of the agitator.

A hub member 10 is axially positioned in the agitator body, extending from front to rear and sealed to the walls 7 and 8 as by welding or other suitable method. The hub member 10 is rearwardly adapted to receive the shaft 5 secured therein. The hub member 10 is provided with an axial passage 11 communicating with and forming a continuation of the interior of the tubular shaft, the passage 11 having lateral ports 12 opening into the interior of the chamber 13, formed by the agitator walls 7 and 8. A smaller axial passage 14 is formed in the forward portion of the hub member 10, also having lateral port openings 15 opening into the chamber 13. The passage 14 forms a bearing for the end portion of a stationary inner tube 16 which communicates with the radial ports 15 and extends rearwardly through the tubular shaft 5 in spaced relation to the latter.

The operating tubular shaft 5 is supported without the tank in a bearing support 17 mounted as herein illustrated upon a bracket 18 secured to the outer wall of the tank 1. The shaft 5 also carries a driving pulley 19 which is belted to the motor 20, suitably positioned for transmission of power to the agitator.

Mounted upon the rearwardly extended end of the tubular shaft 5, is a stationary casing 21 having a bearing for the end of the shaft, the shaft being operatively sealed in the bearing by a conventional packing gland indicated at 22. The casing 21 is constructed with a chamber or enclosed cavity 23 which is in communication with the open end of the tubular shaft 5. The stationary inner tube 16 extends through the end wall of the casing, passing through an opening 24 and being secured in a cap 25, the latter effecting a closure of the opening 24 and being supported in sealed contact with the casing wall as by means of bolts indicated at 26.

The cap 25 carries a connection, indicated by the pipe 27, with a supply of refrigerant fluid transmitted to the inner tube 16 through the connecting passage in the cap. The casing 21 is provided with an opening 28 into the cavity 23, adapted to receive a pipe connection 29 for the discharge of the refrigerant returned through the shaft 5, and the return thereof to the source of supply.

The stationary position of the casing 21 is maintained by means of a rod 30 secured laterally to the casing and extending slidably through a collar 31 having a lateral pin 32 slidably engaged in a lug 33 secured to the bracket 18. A spacer bar 34 is also provided, having connection by means of the bolts 35 and 36 with the casing 21 and the bearing support 17.

In operation, the refrigerant fluid is supplied to the agitator through the inner tube 16 and the lateral ports 15 which, being positioned preferably nearer the apex of the cone-shaped forward wall of the agitator, directs the flow of the entering refrigerant along the latter wall for expansion within the chamber 13. The expanded refrigerant is withdrawn from the agitator chamber 13 through the ports 12, preferably positioned near the rear wall of the agitator body, and passing through the tubular shaft 5 and casing cavity 23 is returned through the pipe connection 29.

Any slight variation from the true axis in the rotation of the shaft 5, causing vibration of the casing, is compensated for in the sliding connection between the rod 30 and the bracket 18.

We claim as our invention:

1. In a device of the class described, an agitator having front and rear walls marginally joined and centrally spaced to form a chamber therebetween, a hub supported in said front and rear walls and having a passage with a constricted front portion opening into said chamber adjacent said front wall and having an enlarged rear portion opening into said chamber adjacent said rear wall, a hollow shaft secured to said hub for operative support of said agitator and having communication with the enlarged portion of said passage and a stationary tube positioned within said shaft having a fluid tight bearing in the constricted front portion of said passage and communicating therewith.

2. In a device of the class described, a rotatable agitator having a body formed of axially spaced front and rear walls enclosing a chamber therebetween, said walls being marginally joined in circular periphery, agitating blades mounted on the outer surface of one of said walls, a hub axially supported in said front and rear walls and having passages communicating with said chamber respectively adjacent said front and rear walls, a tubular shaft attached to said hub for the operative support of said body, said shaft having internal communication with one of said passages, and a tube within said shaft and extending into said hub, said tube having communication with the other of said passages.

In witness whereof we have hereunto attached our signatures.

GEORGE E. WALLIS.
JOHN C. SCOVEL, Jr.